United States Patent
Hartnagel et al.

(10) Patent No.: US 11,719,283 B2
(45) Date of Patent: Aug. 8, 2023

(54) AXIALLY CLAMPING ROTATING ENGINE COMPONENTS

(71) Applicant: Rolls-Royce North American Technologies Inc., Indianapolis, IN (US)

(72) Inventors: Brett Hartnagel, Brownsburg, IN (US); Ryan Humes, Indianapolis, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 830 days.

(21) Appl. No.: 16/379,174

(22) Filed: Apr. 9, 2019

(65) Prior Publication Data
US 2020/0325940 A1   Oct. 15, 2020

(51) Int. Cl.
 *F16D 1/02* (2006.01)
 *F16C 3/02* (2006.01)
 *F02C 3/06* (2006.01)
(52) U.S. Cl.
 CPC ............... *F16D 1/02* (2013.01); *F02C 3/06* (2013.01); *F16C 3/023* (2013.01); *F05D 2230/60* (2013.01)
(58) Field of Classification Search
 CPC .. F16B 7/06; F16B 7/182; F16B 7/185; Y10T 403/295; Y10T 403/299; Y10T 403/291; Y10T 403/293; Y10T 403/29; Y10T 403/297; Y10T 403/56; F16D 1/072; F16D 1/02; F16D 1/06; F16D 1/08; F16D 1/10; F16D 1/12; F05D 2250/281; F05D 2260/30
See application file for complete search history.

(56) References Cited

U.S. PATENT DOCUMENTS

| | | | |
|---|---|---|---|
| 2,845,288 A | 2/1954 | Cierpik | |
| 5,537,614 A | 7/1996 | Nastuk | |
| 6,497,528 B2 | 12/2002 | Hattan | |
| 7,452,188 B2 | 11/2008 | Bouchard | |
| 8,894,011 B1* | 11/2014 | Guerquin | B29C 65/561 244/119 |

(Continued)

FOREIGN PATENT DOCUMENTS

| | | |
|---|---|---|
| DE | 102007062496 A1 | 6/2008 |
| EP | 3091200 A1 | 11/2016 |

(Continued)

*Primary Examiner* — Daniel J Wiley
(74) *Attorney, Agent, or Firm* — Shumaker & Sieffert, P.A.

(57) ABSTRACT

An engine that may comprise a first rotatable shaft, a second rotatable shaft, and a turnbuckle shaft. The first shaft rotatable may be disposed about a centerline axis and have threads disposed thereon. The second shaft rotatable may be disposed about the centerline axis and have threads disposed thereon. The turnbuckle shaft may be axially disposed between the first and second shafts, rotatable about the centerline axis, and have threads disposed thereon for engaging the threads of the first and second shafts. The first and second shafts may be drawn together by a force acting on the threads of at least one of the first and second shafts created by a rotation of the turnbuckle shaft relative to the at least one of the first and second shafts. The turnbuckle shaft may rotationally connect the first shaft and second shaft.

10 Claims, 15 Drawing Sheets

(56) References Cited

U.S. PATENT DOCUMENTS

| | | | | |
|---|---|---|---|---|
| 9,022,684 | B2* | 5/2015 | Coffin | F01D 5/026 |
| | | | | 415/216.1 |
| 9,145,745 | B2* | 9/2015 | Pallini, Jr. | E21B 17/085 |
| 9,371,863 | B2* | 6/2016 | Juh | F16D 1/0876 |
| 9,574,600 | B2* | 2/2017 | Lagarde | F16B 39/10 |
| 9,695,854 | B2 | 7/2017 | Gutta | |
| 10,082,042 | B2* | 9/2018 | Scott | F01D 25/285 |
| 10,519,805 | B2* | 12/2019 | Smith | F02K 1/80 |
| 10,920,811 | B2* | 2/2021 | Rice | F42B 15/36 |
| 2011/0223026 | A1 | 9/2011 | Benjamin | |
| 2013/0035196 | A1* | 2/2013 | Taniguchi | F16H 55/17 |
| | | | | 475/331 |
| 2013/0089432 | A1* | 4/2013 | Mundell | F01D 5/066 |
| | | | | 416/244 R |
| 2013/0269462 | A1* | 10/2013 | Taniguchi | F16H 48/38 |
| | | | | 29/893 |
| 2016/0298492 | A1 | 10/2016 | Smith | |
| 2016/0369655 | A1 | 12/2016 | Scott | |
| 2019/0019826 | A1 | 1/2019 | Scott | |

FOREIGN PATENT DOCUMENTS

| | | |
|---|---|---|
| EP | 3112614 A1 | 1/2017 |
| EP | 3091200 B1 | 6/2018 |
| JP | 2017122438 A | 7/2017 |

\* cited by examiner

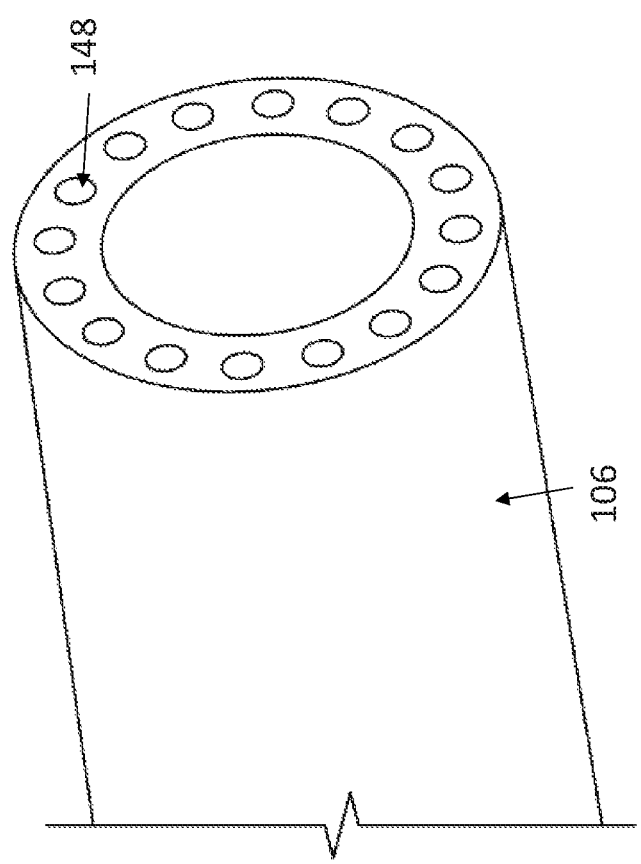

1600 

| Engage threads of the first shaft with the threads of the connecting shaft. | 1601 |

↓

| Engage the threads of the connecting shaft with the threads of the second shaft | 1603 |

↓

| Engage a surface of connecting shaft with a rotating tool | 1605 |

↓

| Draw together the first and second shafts by operating the rotating tool to rotate the connecting shaft about the centerline | 1607 |

↓

| Engage the connecting shaft with an anti-rotation component to prevent rotation of the connecting shaft relative to the first and second shafts | 1609 |

Fig. 16

AXIALLY CLAMPING ROTATING ENGINE COMPONENTS

BACKGROUND

The rotating components of a gas turbine engine, e.g., a turbine disc(s) and compressor disc(s), are clamped together to form a rotor/spool. The systems and methods for axially clamping these components are in need of improvement.

Gas turbine engines commonly use a tie-bolt shaft as a method of joining the rotating components of the engine that form a rotor (also known as a spool). This method of axially clamping the components of the rotor together has drawbacks. For example, modules (groups of some of the components of a rotor) cannot be balanced when only a single tie bolt is used, installing new hardware requires disassembly of the rotor, the order of component assembly may be severely restricted, and low-radius wheel bores leave little clearance in which work may be performed. These and other issues cause difficulty in balancing and replacing components of the rotor, leading to longer maintenance periods. Where the drawbacks of the tie-bolt method of assembly cannot be overcome, other options (e.g., welding, bolted flanges) may be expensive and heavy.

Systems and methods that overcome the issues with tie-bolt (and other) assemblies are provided herein.

SUMMARY

According to some aspects of the present disclosure, a gas turbine engine is provided. The engine may comprise a first rotatable shaft, a second rotatable shaft, and a turnbuckle shaft. The first shaft rotatable may be disposed about a centerline axis and have threads disposed thereon. The second shaft rotatable may be disposed about the centerline axis and have threads disposed thereon. The turnbuckle shaft may be axially disposed between the first and second shafts, rotatable about the centerline axis, and have threads disposed thereon for engaging the threads of the first and second shafts. The first and second shafts may be drawn together by a force acting on the threads of at least one of the first and second shafts created by a rotation of the turnbuckle shaft relative to the at least one of the first and second shafts. The turnbuckle shaft may rotationally connect the first shaft and second shaft.

According to some aspects of the present disclosure, a gas turbine engine is provided. The engine may comprise a centerline axis, a flange, a first shaft, a second shaft, and a connecting shaft. The first shaft may be concentric with the centerline axis and have threads disposed thereon. The second shaft may be concentric with the centerline axis. The connecting shaft may be concentric with the centerline axis, disposed axially between the first and second shafts, have threads disposed thereon for engaging the threads of the first shaft, and may have an axial stop for engaging the flange. A rotation of the connecting shaft relative to the first shaft may cause an axial movement of the first shaft relative to the connecting shaft and second shaft.

According to some aspects of the present disclosure, a method for assembling a gas turbine engine is provided. The method may comprise providing a first rotor having threads disposed thereon about a centerline of said engine; providing a connecting shaft having threads disposed thereon about the centerline; engaging the threads of the first rotor with the threads of the connecting shaft; providing a second rotor; engaging a surface of the connecting shaft with a rotating tool; drawing together the first and second rotors by operating the rotating tool to rotate the connecting shaft about the centerline; and, engaging the connecting shaft with an anti-rotation component to prevent rotation of the connecting shaft relative to the first and second rotors.

BRIEF DESCRIPTION OF THE DRAWINGS

The following will be apparent from elements of the figures, which are provided for illustrative purposes.

FIG. 11 illustrates a perspective view of a shaft in accordance with some embodiments.

FIG. 16 illustrates a flow chart for assembling a turbine engine in accordance with some embodiments.

Figure 1:
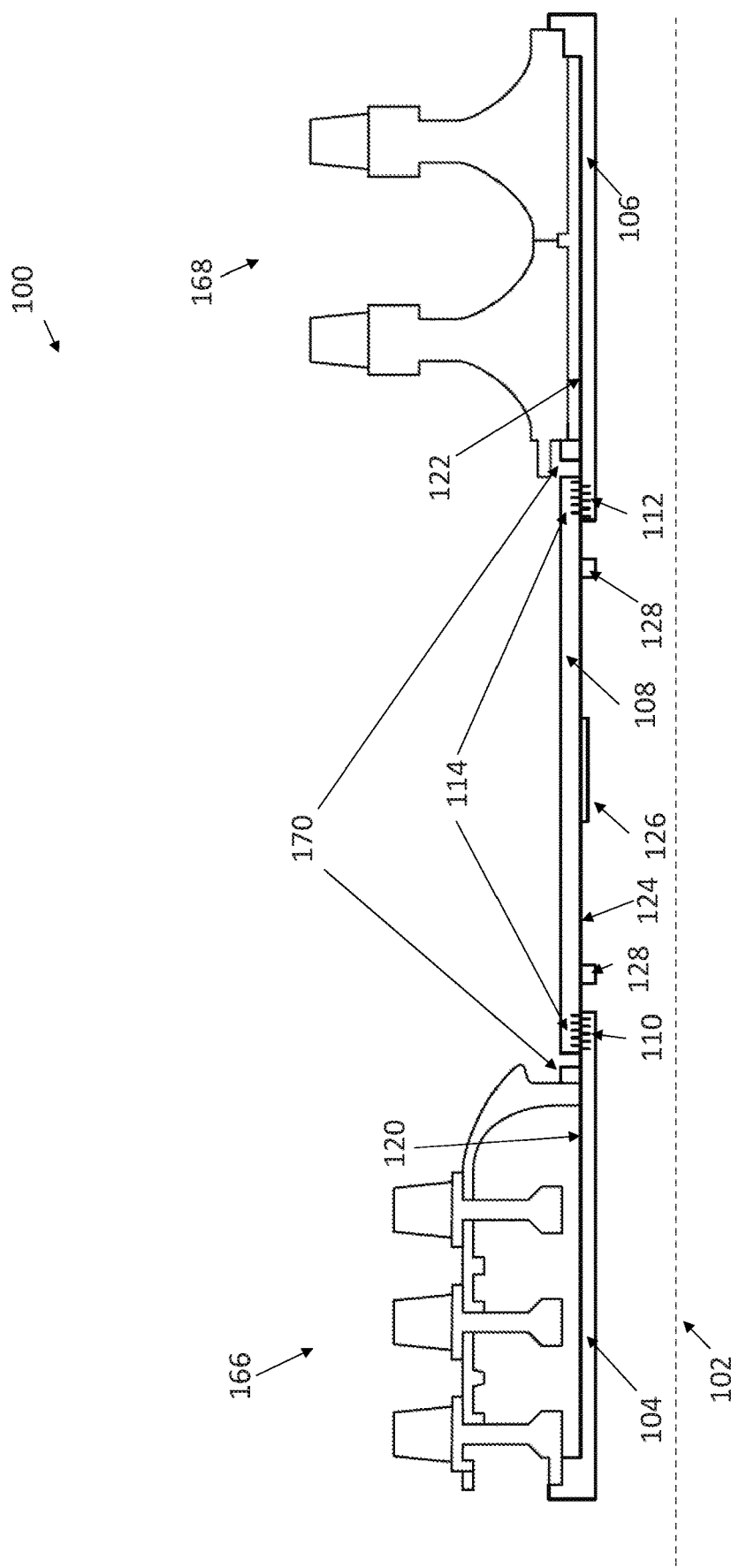
FIG. 1 illustrates a gas turbine engine in accordance with some embodiments.

The present application discloses illustrative (i.e., example) embodiments. The claimed inventions are not limited to the illustrative embodiments. Therefore, many implementations of the claims will be different than the illustrative embodiments. Various modifications can be made to the claimed inventions without departing from the spirit and scope of the disclosure. The claims are intended to cover implementations with such modifications.

DETAILED DESCRIPTION

For the purposes of promoting an understanding of the principles of the disclosure, reference will now be made to a number of illustrative embodiments in the drawings and specific language will be used to describe the same.

In accordance with some embodiments, a gas turbine engine 100 is illustrated in FIG. 1. The gas turbine engine 100 may comprise a compressor 166 disposed on shaft 104 and turbine 168 disposed on shaft 106. Shafts 104 and 106 may be rotationally coupled by connecting shaft 108. Each of these shafts may rotate around the engine centerline 102.

In some embodiments, compressor 166 comprises a plurality of discs. These disc may be assembled together such that compressor 166 forms a module. Shaft 104 may be a tie bolt onto which a nut 170 is threaded in order to compress the plurality of discs together, forming the compressor 166 module. Shaft 104 may further comprise threads 110 on a radially outer surface 120 of shaft 104 proximate to an axial end of shaft 104.

In some embodiments, turbine 168 comprises a plurality of discs. These disc may be assembled together such that turbine 168 forms a module. Shaft 106 may be a tie bolt onto which a nut 170 is threaded in order to compress the plurality of discs together, forming the turbine 168 module. Shaft 106 may further comprise threads 112 on a radially outer surface 122 of shaft 106 proximate to an axial end of shaft 106.

Disposed between the turbine 168 module and compressor 166 module may be a connecting shaft 108. A portion or all of connecting shaft 108 may be disposed radially outward of shafts 104 and 106. As can be seen in FIG. 1, connecting shaft 108 may comprise drive feature 126 and threads 114 located on a radially inner surface 124 at both axial ends. Threads 114 engage threads 110 of shaft 104 and threads 112 of shaft 106. Drive feature 126 may be disposed on a radially inner surface of connecting shaft 108 and provides a structure that is engaged by a tool (described below) used to rotate the connecting shaft 108.

To axially clamp (or de-clamp) the turbine 168 module and compressor 166 module with connecting shaft 108, a tool engages drive feature 126 and rotates the connecting shaft 108. An axial force may be applied to the turbine engine 100 to encourage engagement of threads 114 with threads 110 and threads 112. A circumferential force may be applied to the compressor 166 module, turbine 168 module, or both such that neither module rotates due to the rotation of connecting shaft 108. As connecting shaft 108 rotates relative to shaft 104, shaft 106, or both, a force will be created between threads 114 and threads 110, threads 114 and threads 112, or threads 114 and both threads 110 and 112 that will cause connecting shaft 108 to move in an axial direction relative to shafts 104, shaft 106, or both.

The relative axial movement between the two (or three) shafts may continue until one or both of the shafts contacts an obstruction. For example, connecting shaft 108 may comprise one or more axial stops located proximate to one or both of its axial ends. As connecting shaft 108 moves axially along shaft 104, axial stop 128 located near the forward axial end of connecting shaft 108 approaches and eventually contacts shaft 104. Likewise, shaft 106 may contact an axial stop 128 proximate to the aft axial end of connecting shaft 108. In some embodiments, an axial stop may be located on shaft 104, shaft 106, or both and the axial movement of connecting shaft 108 may be restricted by a contact of connecting shaft 108 and this axial stop. In some embodiments, nut 170 located on shafts 104 and 106 may provide this axial stop functionality.

After compressor 166 module, turbine 168 module, or both are correctly positioned relative to connecting shaft 108, an anti-rotation component (described in more detail below), can be engaged between connecting shaft 108 and shaft 104, connecting shaft 108 and shaft 106, or connecting shaft 108 and both shafts 104 and 106 to prevent the rotation of these shafts relative to one another. During operating of the turbine engine 100 all three shafts, shaft 104, shaft 106 and connecting shaft 108, will rotate in unison.

As can be appreciated, the direction of threads 110 relative to threads 112 will affect the manner in which connecting shaft 108 is used to couple shafts 104 and 106. For example, in some embodiments, threads 110 may be right-handed threads and threads 112 may be left-handed threads (or vice versa). Having opposite threading on shafts 104 and 106 will cause both shafts to draw together (or move apart) due to the relative rotation of the connecting shaft 108.

Connecting shaft 108 may be considered to be a turnbuckle shaft. As such, connecting shaft 108 may also function to stretch one or both of shafts 104 and 106 along its axial length. In some embodiments, the turnbuckle shaft may stretch, thereby increasing the clamp load at the joints between the turbine and compressor modules.

While each of the compressor 166 module and turbine 168 module are described above as being formed using a tie-bolt method, it should be understood that each module could be formed using other methods. In some embodiments, each module may use a connecting shaft to secure the discs of the module in the same manner that connecting shaft 108 couples the compressor 166 module to turbine 168 module.

Figure 2:
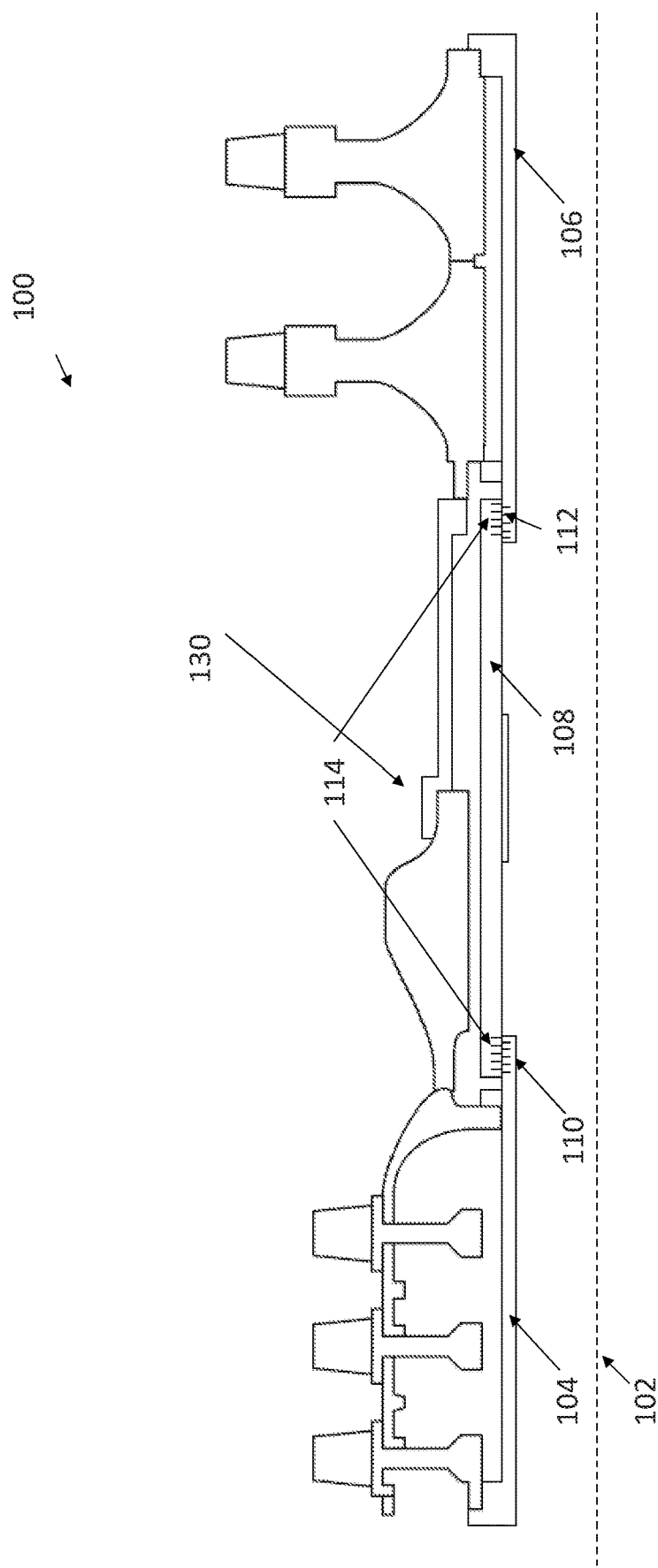
FIG. 2 illustrates another gas turbine engine in accordance with some embodiments.

Axial stops may be placed in positions other than on connecting shaft 108. FIG. 2 shows a turbine engine in which axial stop 130 may restrict the relative axial movement of first shaft 104 and second shaft 106 without interacting with connecting shaft. Threads 110 may be placed on the outer surface of first shaft 104 and threads 112 may be placed on the outer surface of second shaft 106. Connecting shaft 108 may attach on to threads 110 and threads 112. The first shaft 104 may have a first shaft extension and the second shaft 108 may have a second shaft extension. The first shaft extension and the second shaft extension may meet radially outward of the connecting shaft defining axial stop 130.

In some embodiments, the joint formed between the first and second shaft extensions at the axial stop 130 are clamped together. Connecting shaft 108 may be stretched by continuing to rotate it after the first and second shaft extensions contact one another. Connecting shaft 108 may be stretched until the desired clamp load is achieved. In this manner, torque may be transferred through the first and second shaft extensions during operation of the engine while resisting/preventing the turbine and compressor modules separating.

Though depicted without its axial stops 128, this embodiment of the turbine engine may use a connecting shaft 108 that has axial stop 128.

Figure 3:
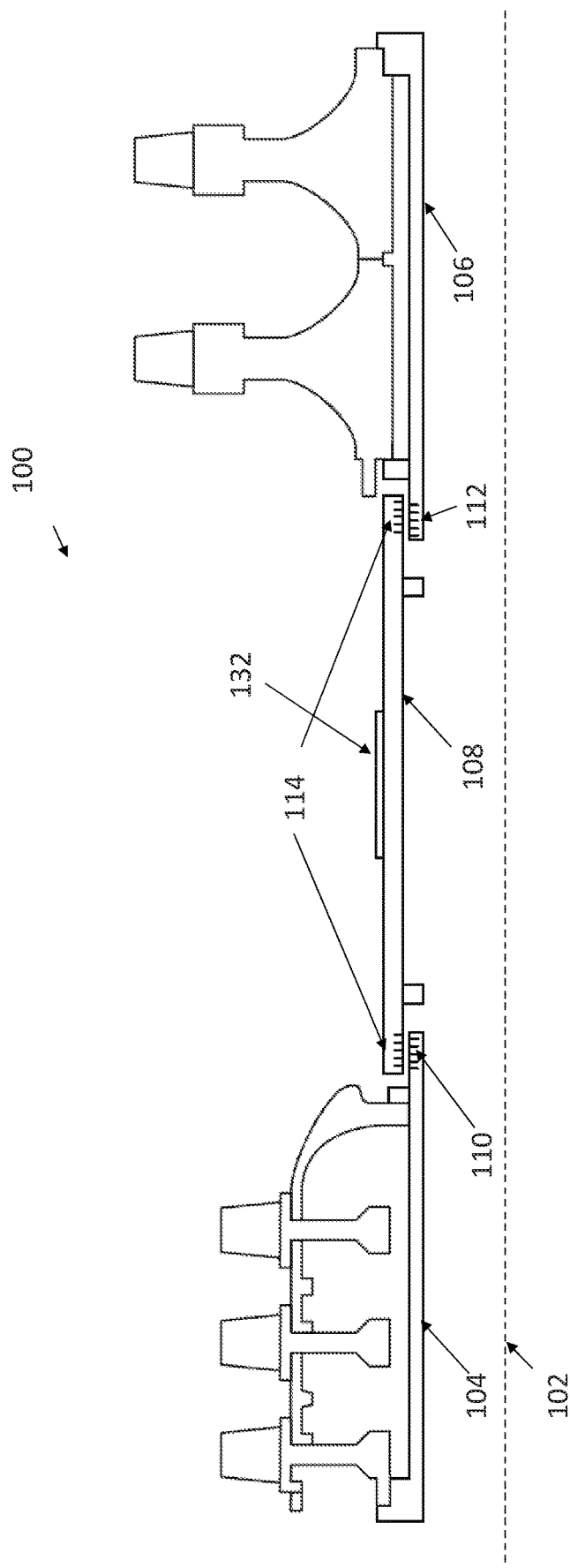
FIG. 3 illustrates another gas turbine engine in accordance with some embodiments.

In some embodiments, a tool engages with a drive feature on the inner surface of the connecting shaft. As shown in FIG. 3, a ridge 132 may enable a tool to engage the outer surface of the connecting shaft 108 and axially position the first shaft 104 and the second shaft 106.

Figure 4:
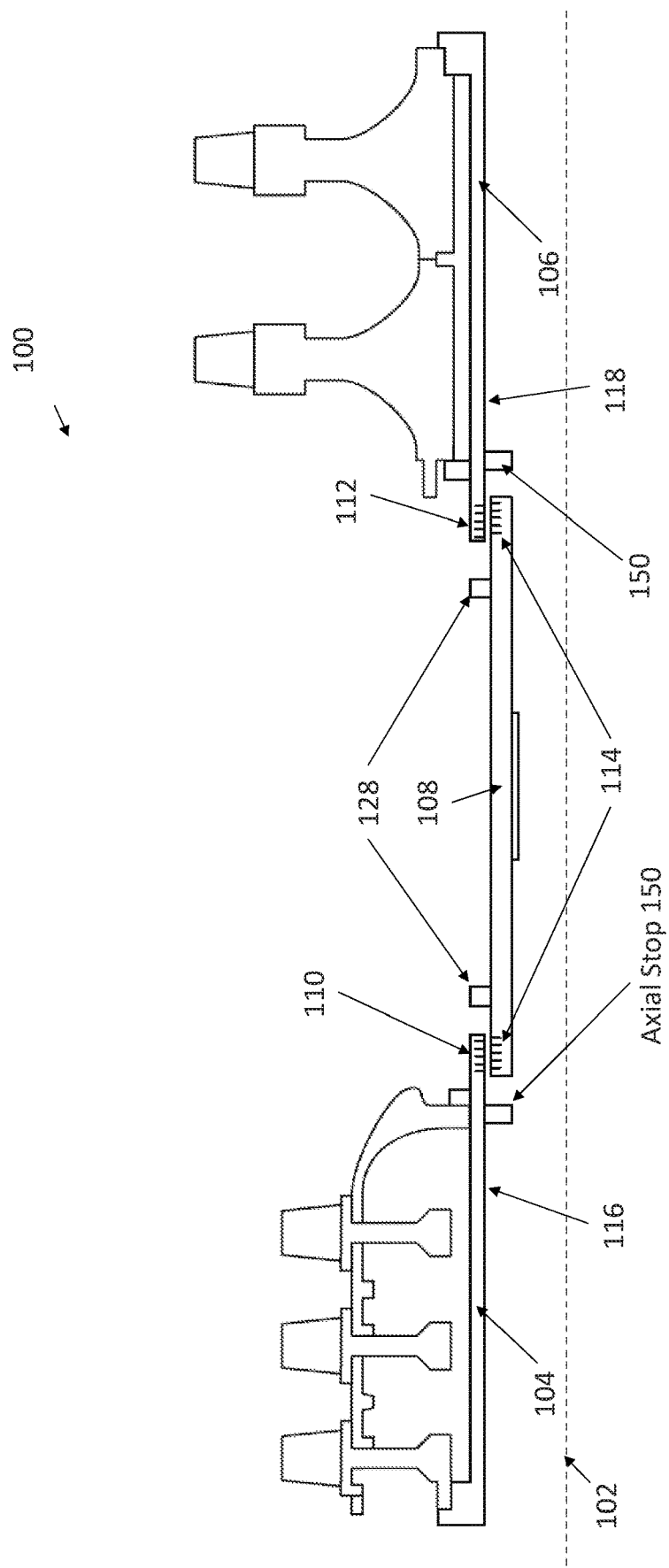
FIG. 4 illustrates another gas turbine engine in accordance with some embodiments.

In some embodiments connecting shaft 108 may be radially inward of the first shaft 104 and the second shaft 106. As shown in FIG. 4, threads 110 and threads 112 may be place on the radially inner surface 116 of the first shaft 104 and the radially inner surface 118 of the second shaft 106. Threads 114 may be placed on the outer surface of connecting shaft 108 to allow the connecting shaft 108 to engage with radially inner surface 116 of first shaft 104 and radially inner surface 118 of second shaft 106. The connecting shaft 108 may have an axial stop 128 on its outer surface to interact with the first shaft 104 and the second shaft 106. Another axial stop 150 may be placed on the radially inner surface 116 of first shaft 104 and the radially inner surface 118 of second shaft 106, as well, to interact with the connecting shaft 108. Connecting shaft 108 may also have drive feature 126 to enable engagement with a tool.

Figure 5:
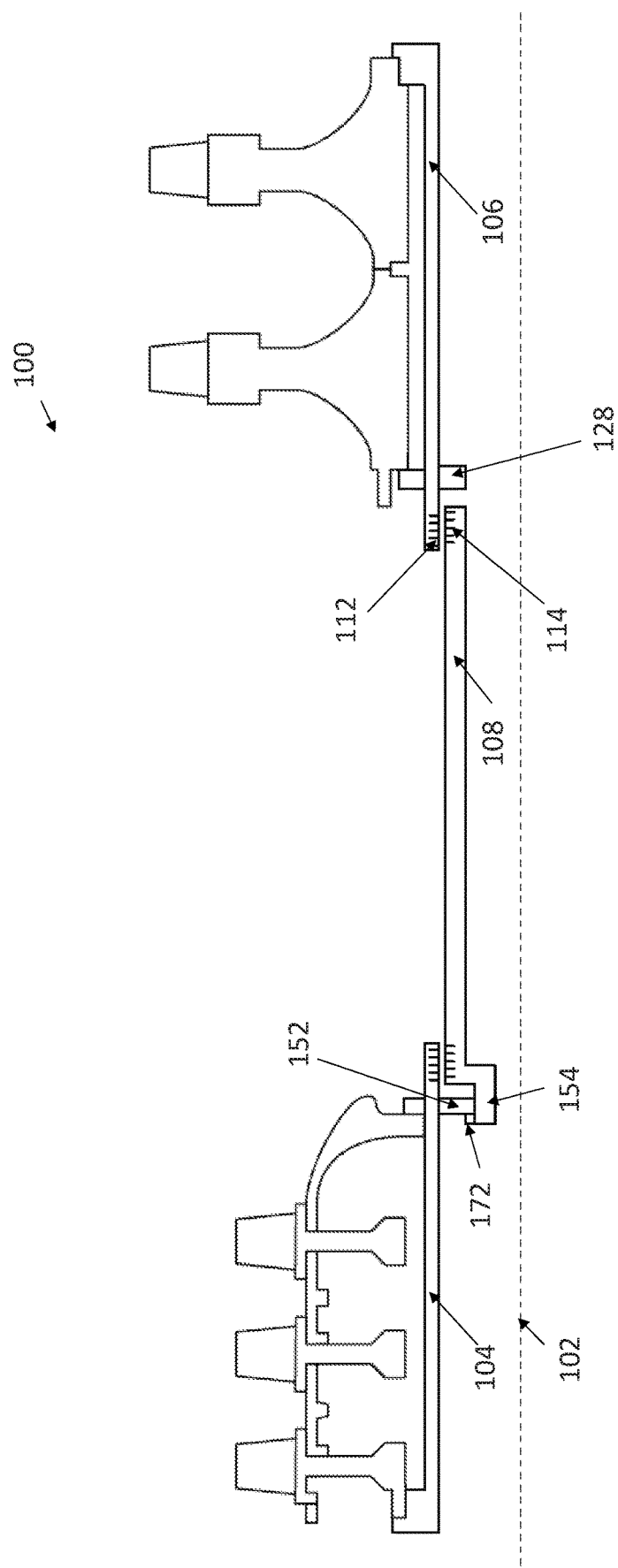
FIG. 5 illustrates another gas turbine engine in accordance with some embodiments.

Referring now to FIG. 5, in some embodiments, the connecting shaft 108 may be slid into the first shaft 104 and connected via an interference fit device threaded on to the shaft 104. Threads 112 may be placed on the inner surface of the second shaft. Axial stop 128, on the inner surface of the second shaft 106, may restrict the axial positioning of the connecting shaft 108. Connecting shaft 108 may have threads 114 on its outer surface near one end. Connecting shaft 108 may also have a lip 154 situated radially inward and extending axially forward of a flange 152 on shaft 104. Lip 154 may operate as an axial stop and restrict axially aft motion of the first shaft 104. A split ring 172 may engage with the lip 154 and the flange 152 to restrict axially forward motion of the first shaft 104.

Figure 6:
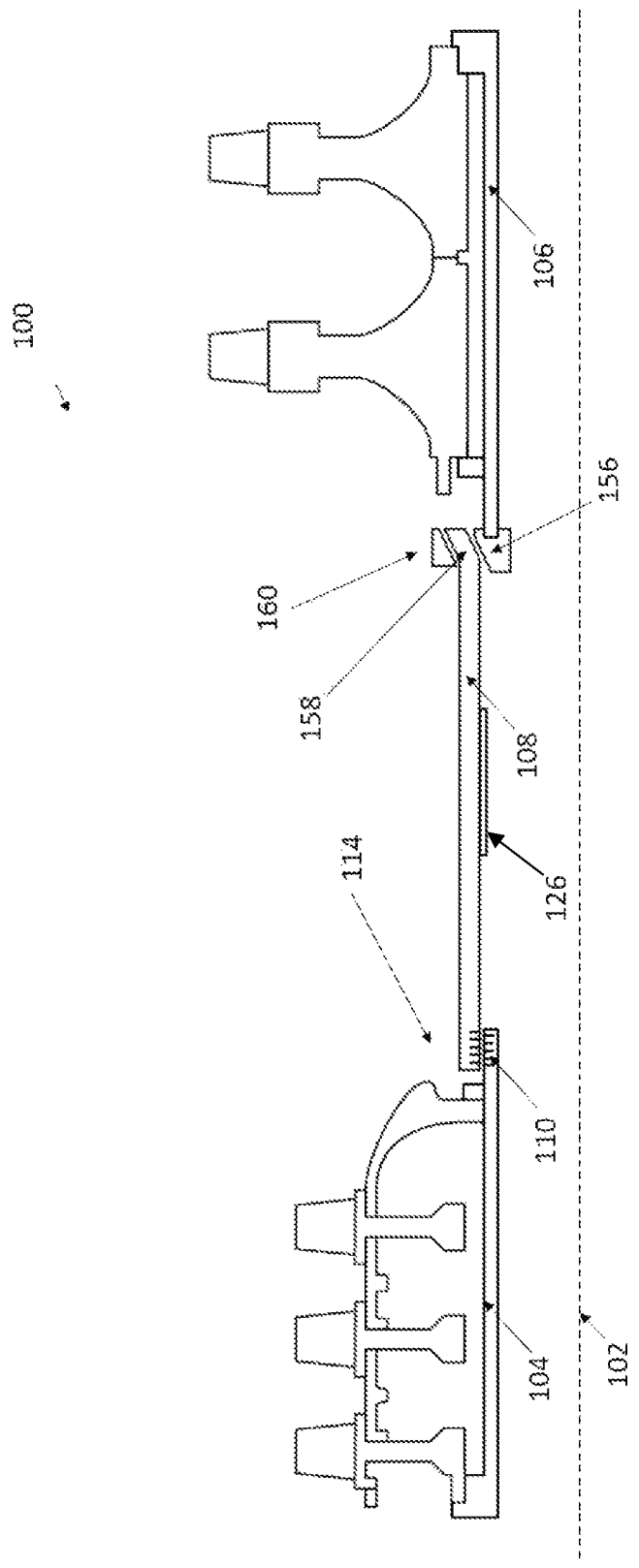
FIG. 6 illustrates another gas turbine engine in accordance with some embodiments.

Some embodiments may only require adjustment of the first shaft. For example, as shown in FIG. 6, the connecting shaft 108 may have a female fitting 158. The female fitting 158 may be angled to provide both axial and radial support while interacting with male fitting 156 on shaft 106 and split ring 160. Threads 114 may be place on the inner surface of connecting shaft 108. Threads 110 may be placed on the outer surface of the first shaft 104 to engage with the Threads 114. A tool may be used to operate the connecting shaft via drive feature 126. In some embodiments, the male-female fitting may be secured such that connecting shaft 108 will not rotate relative to shaft 106.

Figure 7:
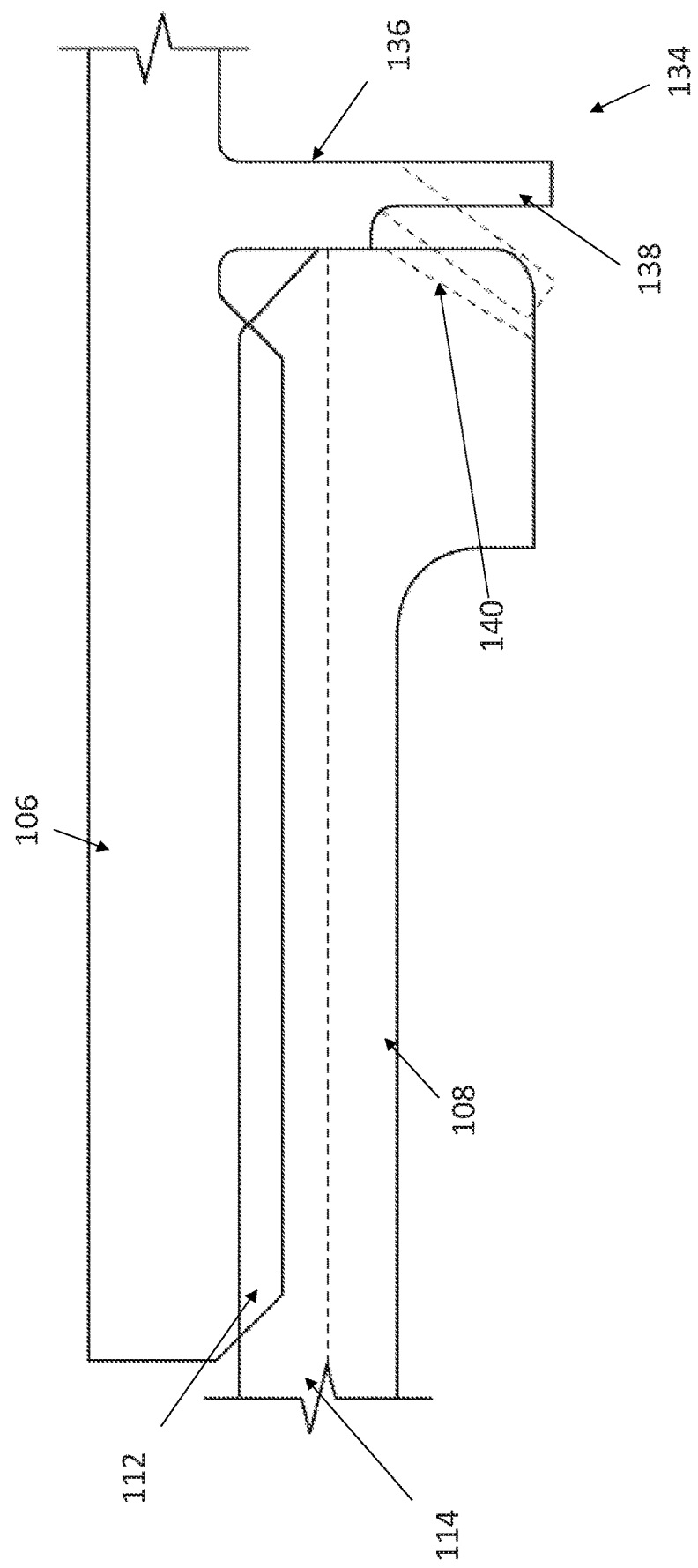
FIG. 7 illustrates an anti-rotation feature in accordance with some embodiments.
Figure 8:
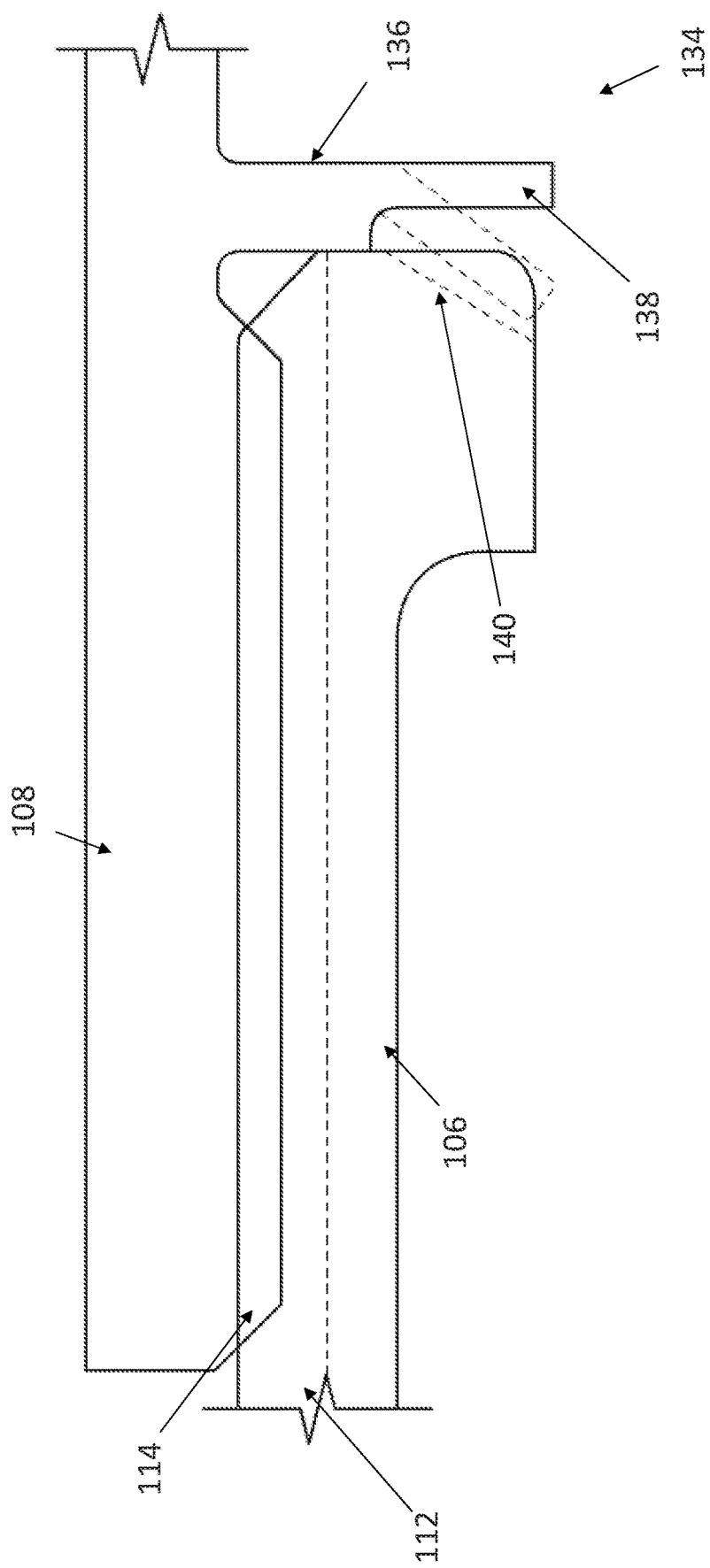
FIG. 8 illustrates another anti-rotation feature in accordance with some embodiments.
Figure 9:
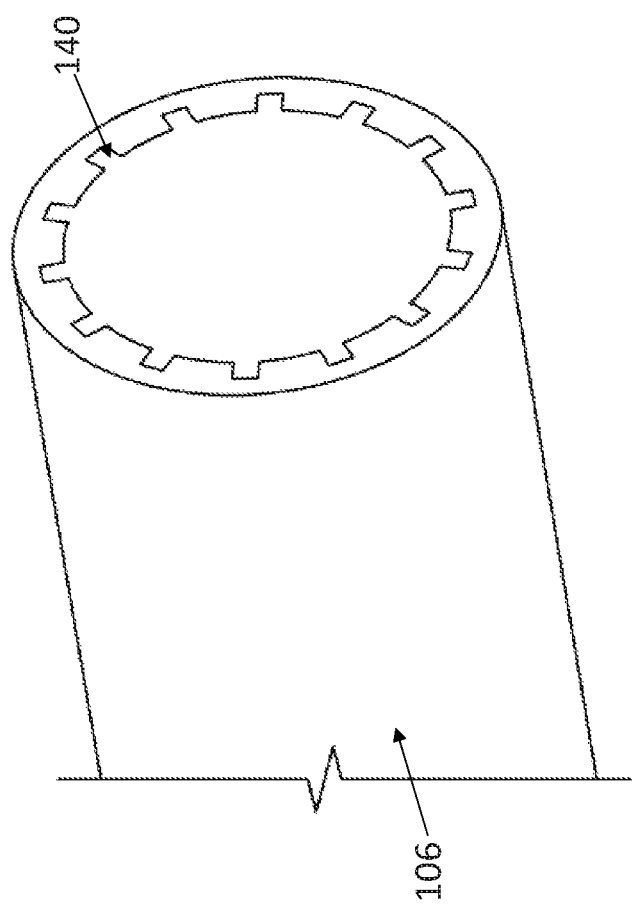
FIG. 9 illustrates a perspective view of a shaft in accordance with some embodiments.

FIGS. 7 and 8 depict devices that prevent the relative rotation between shafts while the engine is operating. In some embodiments, an anti-rotation feature 134 may extend radially inward from the second shaft 106 as shown in FIG. 7. The anti-rotation feature 134 may also act as an axial stop. The anti-rotation feature 134 may have an arm 136 connected to the second shaft 106. A plurality of fingers 138 may extend from the arm. A portion of the plurality of fingers 138 may be bent. This bent portion of the plurality of fingers 138 may interact with a plurality of scallops 140 which extend into an end of the connecting shaft 108. The same anti-rotation feature may also be used on the connecting shaft 108, while the scallops 140 may be cut into the ends of the first shaft 104 and second shaft 106 instead of the connecting shaft 108 (FIG. 8). A perspective view of the second shaft 106 is shown in FIG. 9. As can be seen scallops 140 may extend to the inner surface of the second shaft 106.

Although only the second shaft 106 and connecting shaft 108 are depicted, the same anti-rotation feature may also be used on the first shaft.

In some embodiments, as shown in FIG. 9, fingers 138 have been replaced by a continuous flange that extends around the circumference of the engine. A dimpling tool may be used to deforms one or more portions of the flange into the scallops 140.

Figure 10:
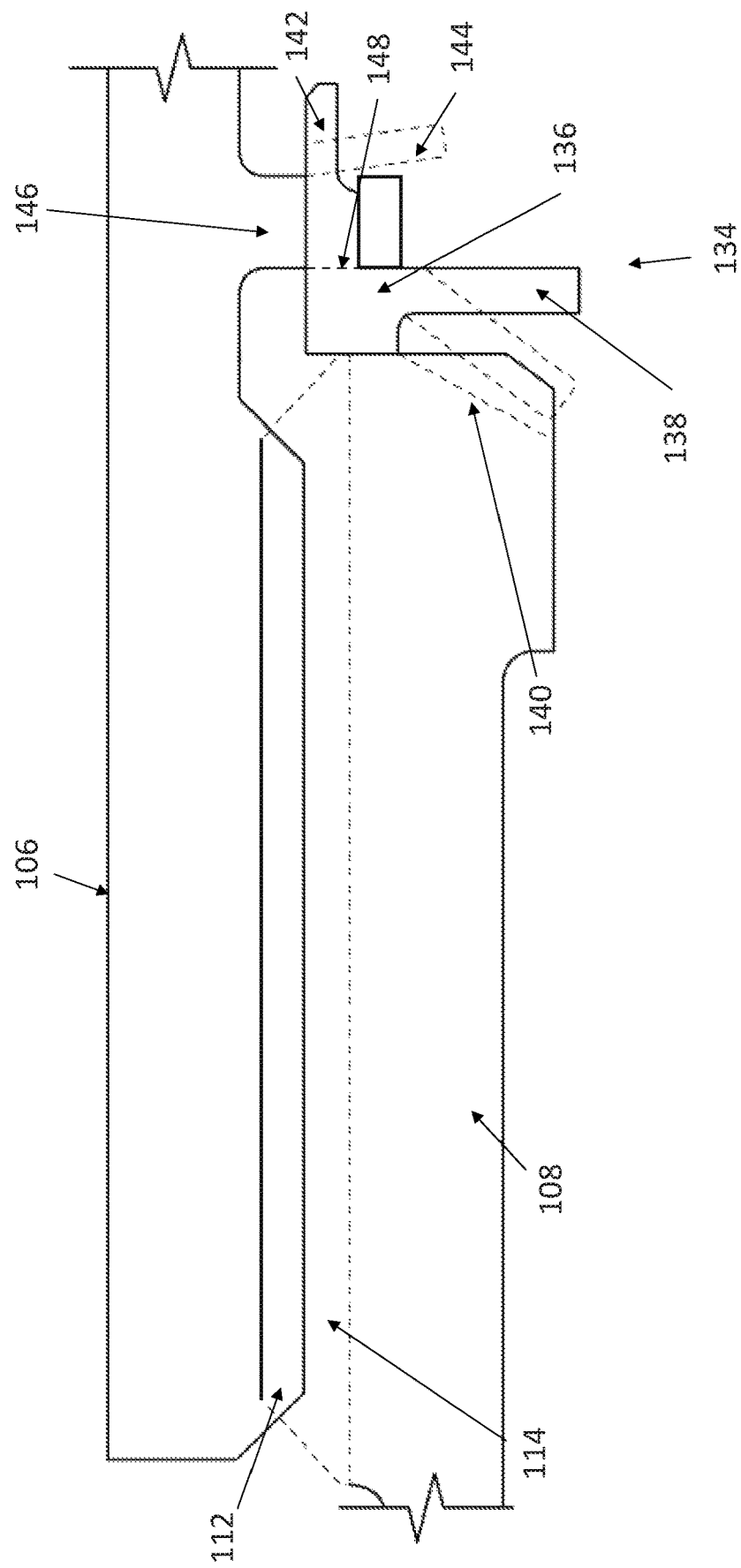
FIG. 10 illustrates an anti-rotation feature in accordance with some embodiments.

In some embodiments, FIG. 10 shows an anti-rotation feature 134. In this embodiment the anti-rotation feature may be inserted into the second shaft 106. Arm 146 may act as an axial stop and contain a plurality of holes 148. The anti-rotation feature 134 may have a plurality of extensions 142, each extension corresponding to a hole 148. A portion of the extensions may be bent to a deformed position 144 to secure the anti-rotation feature in place. Anti-rotation feature 134 may still have arm 136 with a plurality of fingers 138. The fingers 138 may be bent into a plurality of scallops 140 within the connecting shaft. The interaction between the fingers and the scallops 140 may prevent rotation of the shafts with respect to each other. A perspective cross-section of the second shaft may be seen in FIG. 11.

In some embodiments, anti-rotation features may include a dimpled surface, scalloped surface, a facet and a slot, holes with inserted pins, or a key and slot.

Figure 13:
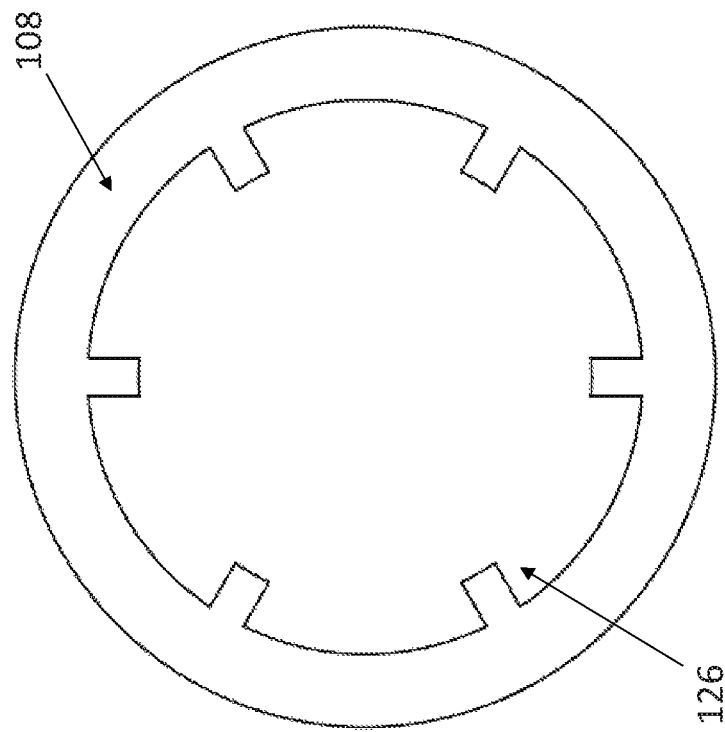
FIG. 13 illustrates a connecting shaft in accordance with some embodiments.
Figure 12:
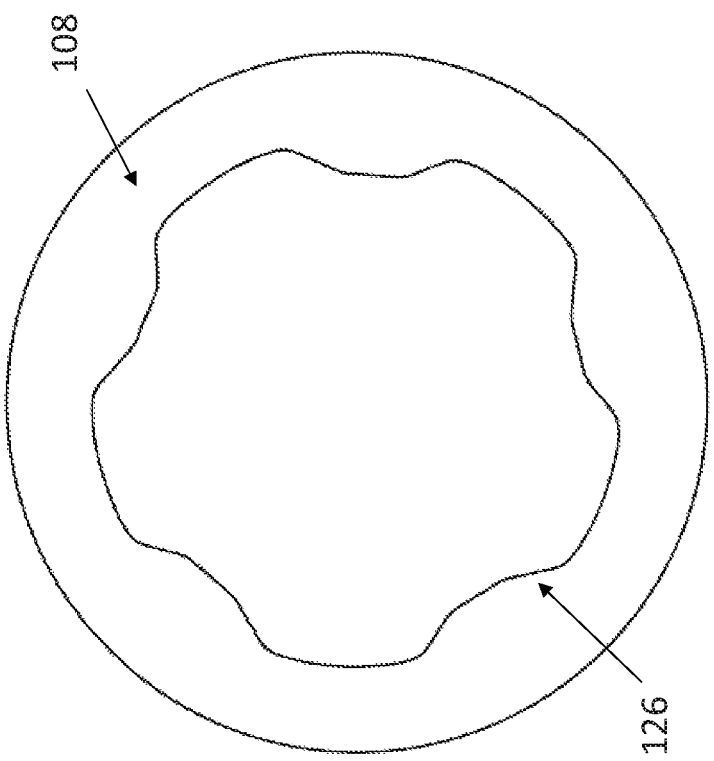
FIG. 12 illustrates a connecting shaft in accordance with some embodiments.

The drive feature 126 within the connecting shaft 108 may have various forms as shown in FIG. 12 and FIG. 13. The drive feature 126 may have rounded edges for reduced wear as shown in FIG. 12 or squared off edges for better grip as shown in FIG. 13. Although depicted with 5 and 8 notches the connecting shaft can have any number of notches. In some embodiments, drive feature 126 may comprise splines.

Figure 14:
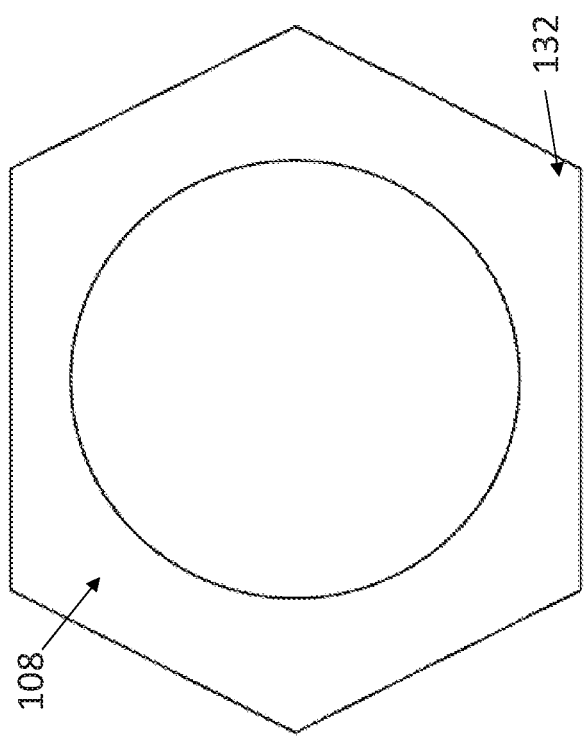
FIG. 14 illustrates a connecting shaft in accordance with some embodiments.

FIG. 14 depicts an example of the drive feature 132 that may surround the connecting shaft 108. Although depicted as a hexagon the drive feature could take the form of a polygon of any number of sides, or any other shape to which a tool can be engaged.

Figure 15:
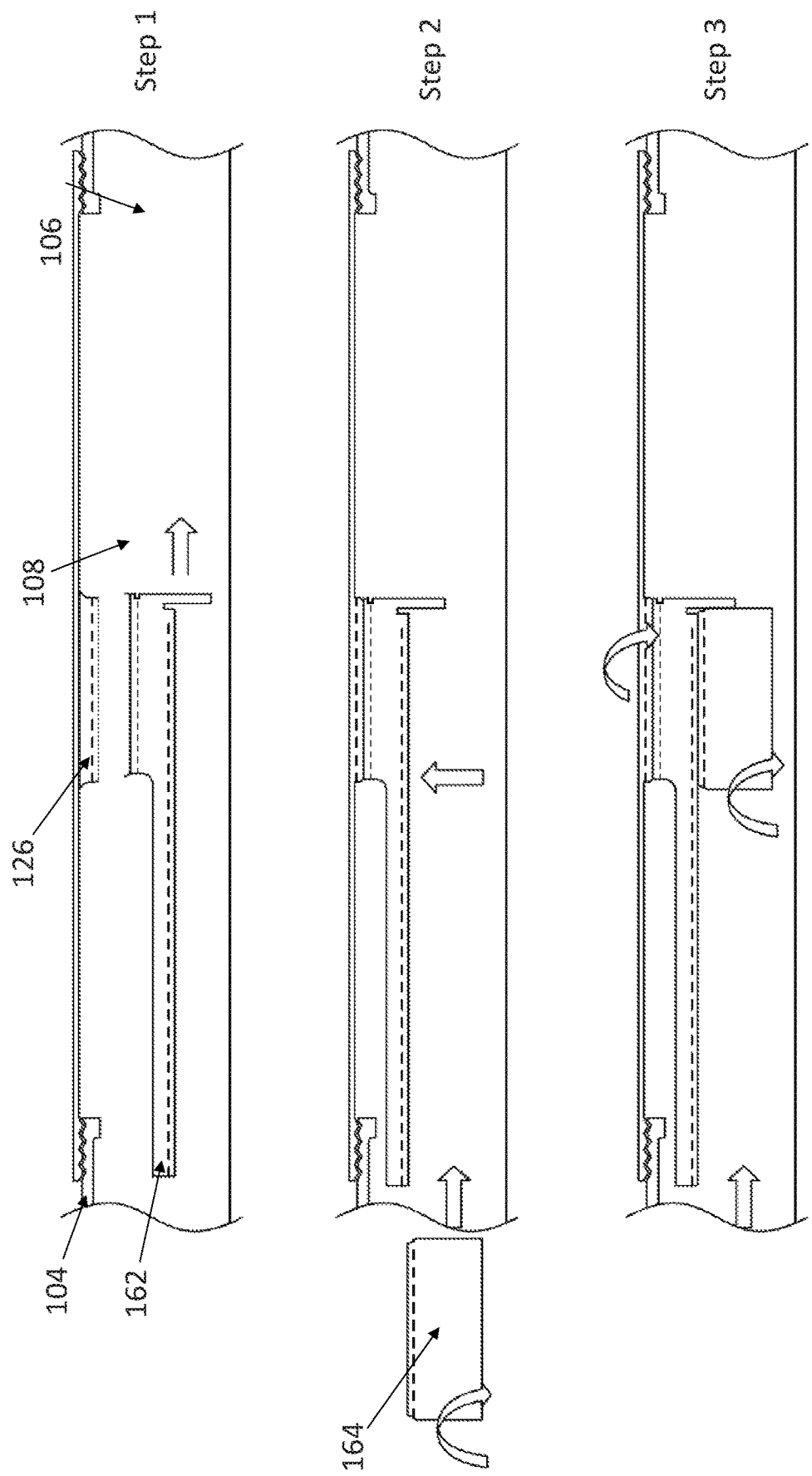
FIG. 15 illustrates a tool engaging a connecting shaft in accordance with some embodiments.

FIG. 15 shows the steps for operating the connecting shaft 108 by using a tool 162. The tool 162 positioned in the connecting shaft in line with the drive feature 126. The tool may not make good contact with the drive feature due to access restraints and relative size of shafting. As a result, an expander 164 may be use to apply pressure on the tool 162 into the drive feature 126. The tool 162 and expander 164 are then rotated, rotating the connecting shaft. In some embodiments, expander 164 may be required due to an access diameter (e.g., as created by the tie-bolt of the compressor module) that is smaller than the diameter of the drive feature 126 on connecting shaft 108.

FIG. 16 is a flow chart showing a method 1600 of assembling a gas turbine engine, with a first shaft having threads disposed thereon about a centerline of said engine, a connecting shaft having threads disposed thereon about said centerline, and a second shaft having threads disposed thereon about said centerline.

In Block 1601 the threads of the first shaft are engaged with the threads of said connecting shaft. In Block 1603 the threads of the connecting shaft are engaged with the threads of said second shaft.

In Block 1605 a surface of connecting shaft in engaged with a rotating tool. The surface could be the outer surface via the ridge, or the inner surface via the drive feature 126. In Block 1607 the first and second shafts are drawn together by operating the rotating tool to rotate the connecting shaft about said centerline. This step may require applying an axial force that is transmitted through said second shaft, connecting shaft, and first shaft; or may require applying a circumferential force to the first shaft and/or the second shaft to prevent the rotation of at least one of shafts while rotating the connecting shaft.

In Block 1609 the connecting shaft is engaged with an anti-rotation component to prevent rotation of the connecting shaft relative to said first and second shafts.

Although examples are illustrated and described herein, embodiments are nevertheless not limited to the details shown, since various modifications and structural changes may be made therein by those of ordinary skill within the scope and range of equivalents of the claims.

What is claimed is:

1. A gas turbine engine comprising:
   a first shaft rotatable about a centerline axis, said first shaft having a radially inner surface with threads disposed thereon;
   a second shaft rotatable about said centerline axis, said second shaft having a radially inner surface with threads disposed thereon; and
   a turnbuckle shaft axially disposed between said first and second shafts, said turnbuckle shaft being rotatable about said centerline axis and having threads disposed thereon for engaging the threads of said first and second shafts, wherein said turnbuckle shaft is disposed radially inward of said radially inner surface of said first and second shafts, wherein said first and second shafts are drawn together by a force acting on the threads of at least one of said first and second shafts created by a rotation of said turnbuckle shaft relative to said at least one of said first and second shafts and wherein the turnbuckle rotationally connects the first shaft and second shaft, wherein said first shaft is a second turnbuckle shaft connecting a plurality of turbine discs or compressor discs of the gas turbine engine; and wherein an end of at least one of the first and the second shafts comprises an arm extending toward the turnbuckle shaft, wherein the arm is configured to abut an end of the turnbuckle shaft, the arm comprising a plurality of fingers extending therefrom, and wherein at least a portion of the plurality of fingers are configured to bend axially to engage scallops in an end of the turnbuckle shaft, the engagement of the fingers and the scallops preventing relative axial rotation between the either of first and the second shafts and the turnbuckle shaft.

2. The engine of claim 1, wherein the threads of one of said first shaft or said second shaft are right hand threads and the threads of the other of said first shaft or said second shaft are left hand threads.

3. The engine of claim 2, wherein both of said first and second shafts move axially relative to said turnbuckle shaft when said first and second shafts are drawn together.

4. The engine of claim 1, wherein said turnbuckle shaft comprises a radially inner surface comprising a drive feature to which a device is engaged to rotate said turnbuckle shaft.

5. The engine of claim 1, wherein said turnbuckle shaft comprises a radially outer surface comprising a drive feature to which a device is engaged to rotate said turnbuckle shaft.

6. A gas turbine engine comprising:
a centerline axis;
a flange;
a first shaft concentric with said centerline axis having a radially outer surface with threads disposed thereon, wherein said first shaft is a turnbuckle shaft connecting a plurality of turbine discs or compressor discs of the gas turbine engine;
a second shaft concentric with said centerline axis having a radially outer surface with threads disposed thereon; and
a connecting shaft concentric with said centerline axis and being disposed axially between said first and second shafts, wherein said connecting shaft is disposed radially outward of said radially outer surface of said first and second shafts, said connecting shaft having threads disposed thereon for engaging said threads of said first shaft and an axial stop for engaging said flange;
wherein a rotation of said connecting shaft relative to said first shaft causes an axial movement of said first shaft relative to said connecting shaft and said second shaft; and wherein an end of at least one of the first and the second shafts comprises an arm extending toward the connecting shaft, wherein the arm is configured to abut an end of the connecting shaft, the arm comprising a plurality of fingers extending therefrom, wherein at least a portion of the plurality of fingers are configured to bend axially to engage scallops in an end of the connecting shaft, wherein the engagement of the fingers and the scallops prevents relative axial rotation between the either of first and the second shafts and the connecting shaft.

7. The engine of claim 6, wherein said flange is rigidly coupled to said second shaft.

8. A method of assembling a gas turbine engine, comprising:
providing a first rotor having a radially inner surface with threads disposed thereon about a centerline of said engine, wherein said first rotor is a turnbuckle shaft connecting a plurality of turbine discs or compressor discs of the gas turbine engine;
providing a connecting shaft having threads disposed thereon about said centerline, wherein said connecting shaft is disposed radially inward of said radially inner surface of said first rotor;
engaging the threads of said first rotor with the threads of said connecting shaft;
providing a second rotor;
engaging a surface of said connecting shaft with a rotating tool;
drawing together said first and second rotors by operating said rotating tool to rotate said connecting shaft about said centerline; and
engaging said connecting shaft with an anti-rotation component to prevent rotation of said connecting shaft relative to said first and second rotors, wherein the anti-rotation component comprises an arm extending from an end of at least one of the first and the second rotors configured to about an end of the connecting shaft, wherein the arm comprises a plurality of fingers extending therefrom, and wherein at least a portion of the plurality of fingers are configured to bend axially to engage scallops in an end of the connecting shaft, the engagement of the fingers and the scallops preventing relative axial rotation between the either of first and the second rotors and the connecting shaft.

9. The method of claim 8, further comprising:
applying an axial force that is transmitted through said second rotor, connecting shaft, and first rotor.

10. The method of claim 8, further comprising:
applying a circumferential force to at least one of said first and second rotors to prevent said rotation said at least one of said first and second rotors while rotating said connecting shaft.

* * * * *